United States Patent [19]

Rotier et al.

[11] 4,031,756

[45] June 28, 1977

[54] ULTRASONIC AIR MOVEMENT AND TEMPERATURE MEASURING APPARATUS

[75] Inventors: Donald Jack Rotier, St. Paul; Frank J. Ferrin, Wayzata, both of Minn.

[73] Assignee: Honeywell Inc., Minneapolis, Minn.

[22] Filed: Aug. 2, 1976

[21] Appl. No.: 710,980

[52] U.S. Cl. .................................. 73/189; 73/194 A

[51] Int. Cl.[2] .......................................... G01F 1/66

[58] Field of Search ................ 73/189, 194 A, 188, 73/170 R, 181

[56] References Cited

UNITED STATES PATENTS

| | | | |
|---|---|---|---|
| 3,222,926 | 12/1965 | Carver | 73/181 |
| 3,246,514 | 4/1966 | Gremlitz et al. | 73/189 |
| 3,379,060 | 4/1968 | Pear | 73/189 |
| 3,548,653 | 12/1970 | Corey | 73/189 |
| 3,889,533 | 6/1975 | Balser | 73/189 |

*Primary Examiner*—James J. Gill
*Assistant Examiner*—Anthony V. Ciarlante
*Attorney, Agent, or Firm*—Henry L. Hanson

[57] ABSTRACT

An ultrasonic air movement vector, magnitude and temperature sensing apparatus using a three element ultrasonic probe with a common transmitter element sending wave energy to selectively positioned receiving elements in the probe in combination with an electronic computational circuit to produce air movement and temperature indicative signals.

10 Claims, 9 Drawing Figures

20
30
36
26
28
24
22
42
32
43
38

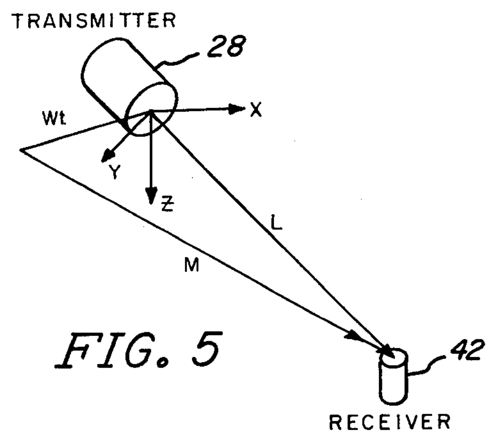
FIG. 5
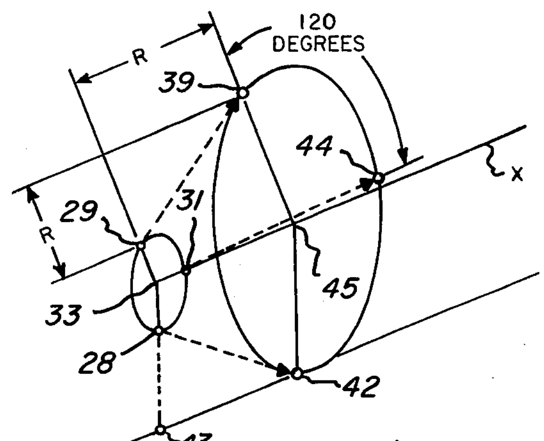
FIG. 4
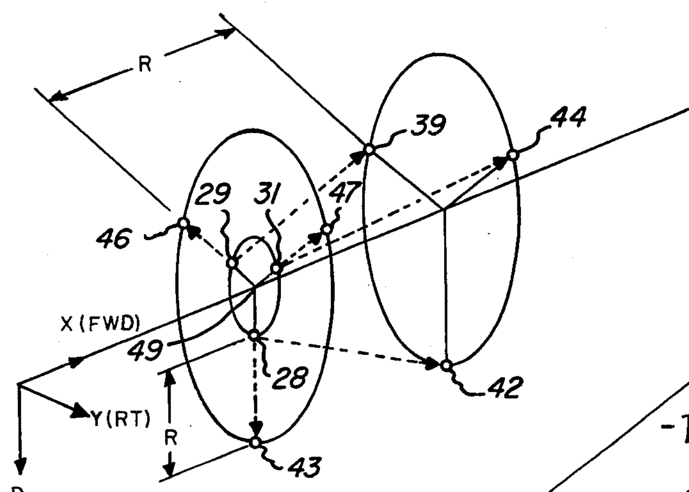
FIG. 8
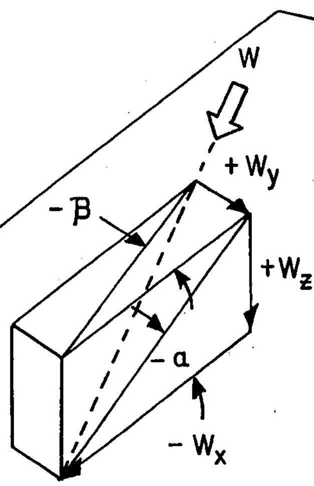
FIG. 6
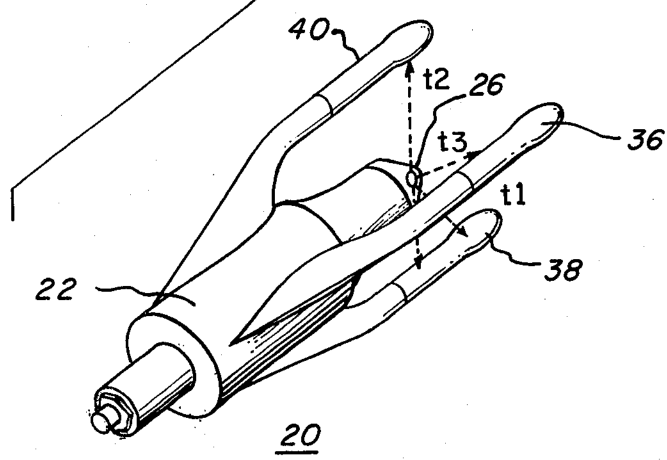

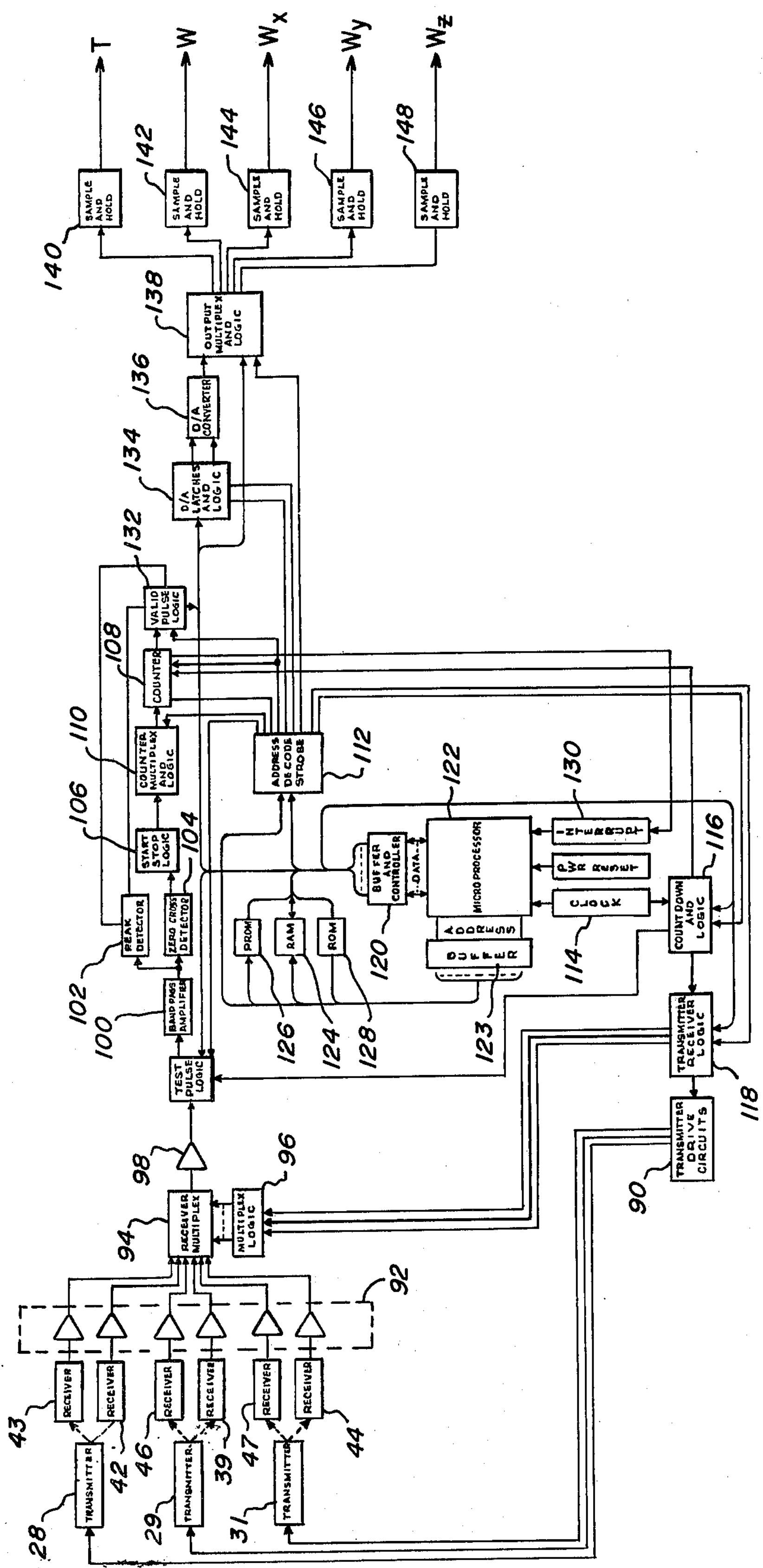
FIG. 9
T
W
$W_x$
$W_y$
$W_z$
140
142
144
146
148
SAMPLE AND HOLD
SAMPLE AND HOLD
SAMPLE AND HOLD
SAMPLE AND HOLD
SAMPLE AND HOLD
138
OUTPUT MULTIPLEX AND LOGIC
136
D/A CONVERTER
134
D/A LATCHES AND LOGIC
132
VALID PULSE LOGIC
108
COUNTER
110
COUNTER MULTIPLEX AND LOGIC
106
START STOP LOGIC
104
102
PEAK DETECTOR
ZERO CROSS DETECTOR
100
BAND PASS AMPLIFIER
TEST PULSE LOGIC
112
ADDRESS DECODE STROBE
122
MICRO PROCESSOR
130
INTERRUPT
PWR RESET
CLOCK
114
120
BUFFER AND CONTROLLER
DATA
ADDRESS
BUFFERS
123
PROM
RAM
ROM
126
124
128
116
COUNT DOWN AND LOGIC
118
TRANSMITTER RECEIVER LOGIC
90
TRANSMITTER DRIVE CIRCUITS
98
96
MULTIPLEX LOGIC
94
RECEIVER MULTIPLEX
92
RECEIVER
43
42
46
39
47
44
TRANSMITTER
28
29
31

ULTRASONIC AIR MOVEMENT AND TEMPERATURE MEASURING APPARATUS

BACKGROUND OF THE INVENTION

The present invention relates to an apparatus for measuring the relative speed, direction and temperature of air moving past an ultrasonic sensing probe. In particular, the present invention comprises a wind vector, velocity and temperature measuring apparatus utilizing variations in the propagation time of ultrasonic waves moving from a transmitting transducer means to a plurality of spatially positioned receiving transducer elements.

An aircraft in flight is normally moving so that air will be flowing past the aircraft or moving relative to the aircraft. In order to exercise optimum control over the aircraft itself, or over operations associated with the aircraft when in flight, it is necessary to know the manner in which air is moving past the aircraft. By having an accurate measure of the air movement and its temperature, it is then possible to obtain a measure of the forces that are being exerted on the aircraft.

The air movement relative to the aircraft is most conveniently considered in three dimensions; related to the aircraft itself, the directions being along a primary or forward and reverse axis of the aircraft, a vertical axis extending up and down at a right angle to the primary axis of the aircraft, and a horizontal axis extending left and right at a right angle to the primary axis of the aircraft.

Ultrasonic measuring devices have been utilized heretofor for purposes of measuring liquid and gaseous flows. In addition, ultrasonic anemometers and temperature sensors have been built but such apparatus heretofore known has not been suitable or practical for use in aircraft installations where factors of size, weight and accuracy must be optimized.

Representative ultrasonic anemometer type apparatus heretofore known will be found in the following identified references:

"A Continuous-Wave Sonic Anemometer-Thermometer", J.C. Kaimal and J.A. Businger (manuscript received Mar. 5, 1962) (pp. 156–167)

"Deriving Power Spectra from a Three-Component Sonic Anemometer", J.C. Kaimal, J.C. Wyngaard and D.A. Haugen, October, 1968. (pp. 827–837)

"Improvements and Refinements on a Pulse Type Sonic Anemometer", Arthur Bisberg, Arthur Papas, and David J. Beaubien. (pp 1–50)

"Wind Speeds as Measured by Cup and Sonic Anemometers and Influenced by Tower Structure", Yutaka Izumi and Morton L. Barad, December, 1970. (pp. 851–856)

In a copending application of D. J. Rotier entitled "Air Movement Measuring Apparatus", Ser. No. 675,036, filed Mar. 8, 1976, there is disclosed a three element ultrasonic probe for an aircraft that is intended for measuring relative air movement vector and velocity. As the movement of an ultrasonic signal through air is a function of the temperature of the air, it is necessary to know the air temperature in determining relative airspeed. The probe in the aforesaid application makes use of a platinum wire temperature sensor to provide a temperature signal needed to compensate for the ultrasonic signal propagation time changes caused by variations in temperature. Such an arrangement is relatively expensive and does not provide the accuracy required for some applications where a substantially instantaneous measure of air temperature is required.

SUMMARY OF THE INVENTION

The present invention is a new and improved air movement vector, magnitude and temperature sensing apparatus utilizing an ultrasonic wave transmitting transducer which is arranged to radiate ultrasonic wave energy along separate paths to ultrasonic receiver transducers, the paths being provided to serve as a convenient means for readily determining the variations in the relative propagation times of an ultrasonic wave from the transmitter transducer along the paths which will be representative of the relative vectors, speed and temperature of air flowing past the sensing apparatus. In one preferred embodiment, the sensing probe includes in at least one leg thereof, two separate receiver transducers arranged to respond to the wave energy from the same transmitter transducer. The signal paths are selected so as to provide a convenient means for obtaining an airspeed signal and an air temperature signal. The signals from the receiver transducers are coupled through appropriate amplifiers and time differential sensing apparatus into computer circuitry from which it is possible to calculate the relative air movement in terms of its vectors and speed and the air temperature. Another preferred embodiment utilizes three separate ultrasonic wave paths for determining the temperature of the air at the sensing probe and this is achieved by a sharing of the transmitting transducers by both the airspeed and air temperature receiver transducers.

The sensing probe is physically arranged and formed so as to be operative over a wide range of air speeds and to minimize the generation of air flow disturbances in the measuring paths of the probe which would otherwise disrupt the measuring functions of the probe. The probe is also arranged, with its control circuits, to transmit wave energy in only one direction in each signal path to the associated receiver transducers to enhance the overall physical design achievable only when this is done. Further, the probe is connected as a part of a new and improved computational system which has been designed to match the unique functional characteristics of the probe to an optimized set of timing signals derived from the multiple ultrasonic paths of the probe.

BRIEF DESCRIPTION OF THE DRAWING

FIG. 4 illustrates the basic geometry associated with the positioning of the transmitting and receiving transducers of the sensing probe;

FIG. 5 illustrates the basic geometry associated with a representative flow of air with respect to a single transmitter and receiving transducer of the invention;

FIG. 6 illustrates the basic probe geometry relative to three basic air movement vectors associated with a representative air flow past the probe of the invention;

FIG. 8 illustrates the geometry of a modified form of probe incorporating six receiver transducers; and FIG. 9 illustrates diagrammatically control and sensing circuitry for use with probe assembly incorporating six receiver transducers.

DESCRIPTION OF THE INVENTION

Figure 1:
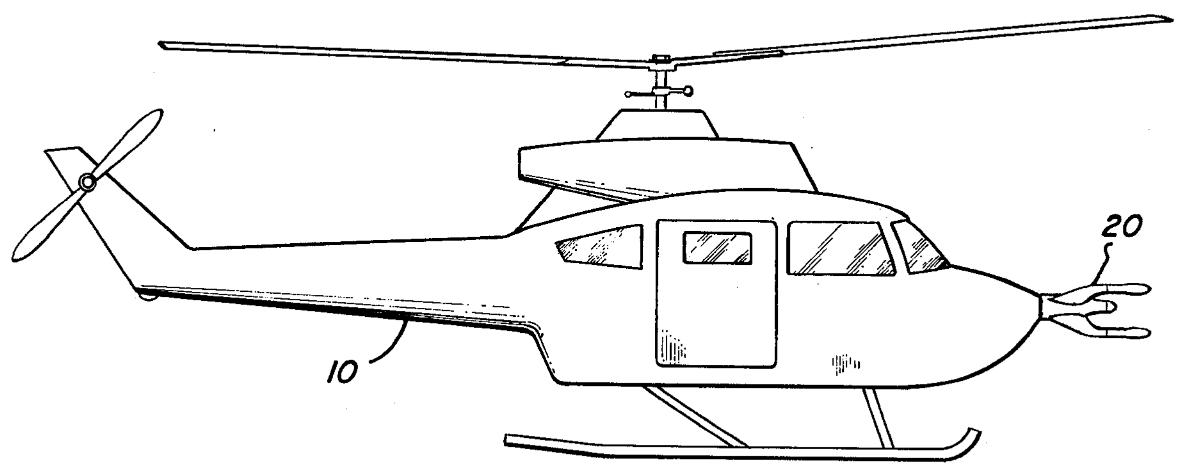
FIG. 1 is a representation of an aircraft carrying an air sensing probe of the present invention.

Referring first to FIG. 1, there is here illustrated an aircraft 10 in the form of a helicopter. Mounted on the forward end of the aircraft is an air sensing probe 20. The probe 20, as contemplated herein, is particularly adapted for use on helicopter type aircraft. The reason for this is that helicopters are capable of being operated over wide ranges of airspeed and direction. For example, helicopters may be operated under conditions involving wide variations in altitude, movement to the left or right, as well as movement along the longitudinal axis of the craft. In the more normal type of operation, helicopter type aircraft will be operated so that there is some component of forward movement. By placing the probe 20 on the forward end of the aircraft 10, as illustrated, the probe will be substantially free of any lift propellor "down-wash" when the craft is moving forward at a speed of ten knots or more.

Figure 2:
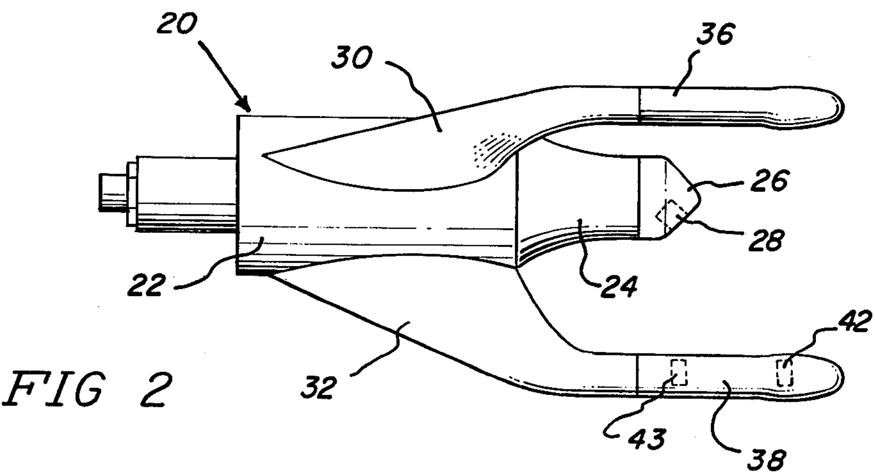
FIG. 2 illustrates a side view of the sensing probe.

The probe 20 is shown in greater detail in FIG. 2 and will be seen to comprise a base supporting element 22 which is adapted to be fastened to an aircraft in any suitable manner, but preferably along the longitudinal axis of the craft so that the elements of the probe project in a forward direction or along the primary axis of the craft. Extending from the support member 22 is a transmitter support 24 which carries a transmitting transducer head 26 on the end thereof. The forward surface of the transducer head 26 is tapered at an angle of approximately 45°. Mounted in the surface of this transducer head are three transmitting transducers, only one of which is illustrated at 28 in FIG. 2. The surface of the transducer 28 is essentially flush with the surface of the transducer head 26 and, when driven, is adapted to cause an ultrasonic wave to be projected from the surface of the transducer with the central axis of the wave being along a path that is essentially perpendicular to the surface. In the front end view of the probe assembly in FIG. 3, the surface of two additional transmitting transducers 29 and 31 are shown.

Figure 3:
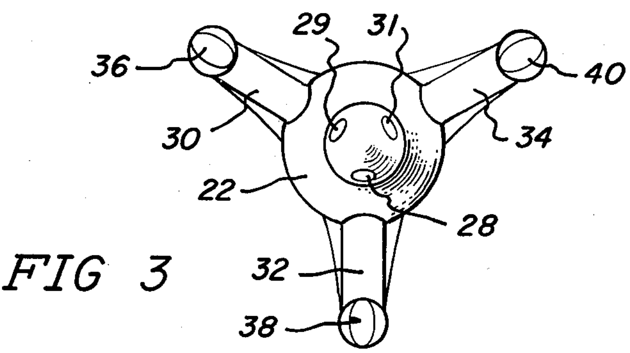
FIG. 3 illustrates a front end view of the sensing probe.

Also carried on the support 22 are three receiver supports 30 and 32 shown in FIG. 2 and 34, as shown in the end view of FIG. 3, which project outwardly and forwardly from the support 22 and carry at their outer ends three receiver transducer housings 36, 38 and 40 respectively. The assembly is streamlined, particularly in the forward facing direction, so as to minimize the extent to which air flow passing over the surfaces will be disturbed and thereby interrupt the effectiveness of the overall probe. At least one receiver transducer is mounted in the face of each of the housings 36, 38 and 40. A receiver transducer 42 is shown in the housing 38. A second receiver transducer 43 is also shown in housing 38. Each of the receiver transducers are mounted on the inner surfaces of the housings so as to be in a direct communication path with an associated transmitting transducer. In one particular embodiment of the invention, the receiving transducer 42 was positioned approximately two inches forward of its corresponding transmitter trandsducer and approximately two inches laterally or to the side from the principal axis of the probe 20.

The probe 20 has been designed so that ultrasonic wave energy from the transmitter head 26 moves in a single direction toward the receivers rather than in both directions along a common path as has been done in other types of ultrasonic flow measuring devices. The present arrangement permits the design of optimum types of transmitting and receiver transducers without requiring that those transducers function in a dual mode. Thus, the receiver transducers may be smaller in size and housed in the protective housing which may be formed so as to be less likely to induce air disturbances over the intended operating ranges of the probe. Further, the time difference measurements discussed below are best handled with respect to a single fixed-direction path in the probe as will occur when the probe of the present invention is used The preferred geometrical configuration for the transmitters and receivers in the probe 20 are illustrated in FIG. 4. In FIG. 4 the common or principal axis of the probe is identified by the line X. Three transmitting transducers 28, 29 and 31 are represented by the dots which appear upon a common plane which is at right angles to the axis X and which plane intersects the axis at point 33. In the preferred embodiment, the transmitting transducers 28, 29 and 31, are displaced from the primary axis X by a common or equal distance.

Three receiver transducers 39, 42 and 44, are also equally spaced about the principal axis X and in a common plane which is at right angles to the axis X and intersects the axis at a point 45. In the common plane of the transmitting transducers and receiver transducers, the respective transducers are displaced 120° with respect to each other. As indicated above, the longitudinal displacement of the transmitter transducers and the receiver transducers is approximately two inches, which, in FIG. 4 is represented by the displacement of point 33 from that of point 45. Similarly, the respective receiving transducers are positioned radially approximately two inches from the central probe axis.

In one embodiment of the invention, a single ultrasonic temperature measuring path was used and this is defined in FIG. 4 by the path between the transmitting transducer 28 and the receiver transducer 43. The receiver transducer 43 is positioned in a plane which is perpendicular to the axis of and passes through the common plane of the transmitting transducers 28, 29 and 31.

FIG. 5 illustrates the basic geometry associated with a single transmitter - receiver transducer combination. Here there is shown the transmitter transducer 28 and its cooperating receiver transducer 42. The principal axis X is illustrated as well as the secondary axes Y and Z. The vector representing the direct transmitter to receiver transmission is illustrated by the line $W_t$. The resultant wave transit vector is represented by the line M.

When ultrasonic wave energy is transmitted by the transmitter 28, that energy is projected toward the receiver 42 and, in the absence of any air movement, the wave energy transmitted will be received at the receiver 42 in a first time interval. If there is an air movement, such as represented by the vector line $W_t$, the ultrasonic wave energy from the transmitting transducer will have to traverse what constitutes a longer path in its journey from the transmitter transducer 28 to the receiver transducer 42 and this will result in the time interval for such a transmission being longer than that when there is no air movement. The existence of this time interval differential between an air movement and no air movement provides the basic signal necessary for determining the air movement vector and velocity or speed past the probe.

FIG. 6 illustrates more of the geometry of the probe of the system. In this figure, the probe 20 is represented with its centrally positioned transmitting transducer head 26 and the spatially positioned receiver transducer housings 36, 38 and 40. The preferred positioning of the probe relative to the axis of the aircraft is illustrated with the principal axis Y being defined as being forward, the axis horizontal and to the right by the axis Y, and the down axis by the axis Z. Air or wind moving relative to the probe is also illustrated in the figure by the actual wind W shown divided into its three basic components $W_x$, $W_y$, and $W_z$. In most instances, particularly when the probe is to be used in a helicopter type of aircraft, it is desirable to measure the actual airspeed as well as all three of the air movement vectors represented in FIG. 5.

The mathematical equations associated with the basic functioning of the probe 20 are as follows:

$$W_x = \frac{-R}{3}\left(\frac{1}{t_1} + \frac{1}{t_2} + \frac{1}{t_3}\right) - \frac{C^2 - W^2}{6R}(t_1 + t_2 + t_3)$$

$$W_y = -R\frac{\sqrt{3}}{3}\left(\frac{1}{t_2} - \frac{1}{t_3}\right) + \sqrt{3}\,\frac{C^2 - W^2}{6R}(t_2 - t_3)$$

$$W_z = \frac{R}{3}\left(\frac{2}{t_1} - \frac{1}{t_2} - \frac{1}{t_3}\right) - \frac{C^2 - W^2}{6R}(2t_1 - t_2 - t_3)$$

The ultrasonic wave velocity C at a particular operating temperature may be represented by the following equation:

$$C^2 = W_x\left(\frac{2_R}{t_4 - t_1}\right) + W^2 + \frac{2R^2}{(t_4 - t_1)}\left(\frac{1}{2t_4} - \frac{1}{t_1}\right)$$

The wave velocity varies as the square root of the absolute temperature, consequently the temperature equation is:

$$T = \left[\frac{C}{346.192}\right]^2 298 - 273 \text{ (degrees centigrade)}$$

To achieve more accurate computation and to facilitate calibration, it is better to express the wind vector and wave velocity equations in terms of difference-times. By expanding the inverse time parameters in each of the equations using series expansions and then combining with the other terms, difference-time equations result. Because of the approximations used in the series expansions, it was found that better accuracy resulted by also including equation modifications using curve fitting techniques. The final set of equations selected take the following form:

$$W_x = S_1W^2 + [S_2 + S_3W^2 + S_4(T-25)]\,[t_1 + t_2 + t_3 - 3t_o] + [S_5(T-25) + S_6(T-25)^2]$$

$$W_y = Q_1\,[Q_2 + Q_3W_x + Q_4(T-25)]\,[t_2 - t_3]$$

$$W_z = Q_5\,[Q_2 + Q_3W_x + Q_4(T-25)]\,[2t_1 - t_2 - t_3]$$

$$W^2 = W^2_x + W^2_y + W^2_z$$

$$C = P_1\,[P_2W_x + (P_3c^2 + P_4W^2)(t_4 - t_1)]$$

$$(T-25) = R_1C^2 + R_2$$

$S_1$ $S_6$, $Q_1$ $Q_5$, $P_1$ $P_4$, $R_1$ $R_2$, are constants $t_1$, $t_2$, $t_3$, $t_4$ are transit times in the ultrasonic paths to the receiver transducers 39, 42, 44 and 43.

$t_o$ = reference time (constant)

(T−25) = temperature −25° C

The selection of the foregoing equations with the objective of optimizing the hardware implementation makes it possible to design a new computational system which will perform the calculations as necessary. The actual implementation may be carried out using digital or analog type of computational hardware.

The use of the simplified equations enables the apparatus to be configured in a form which is less expensive, involves less hardware, while achieving a degree of accuracy far greater than has been possible heretofore. This may be seen by noting that in the first set of equations, the equations each contain a term requiring the taking of the differences of the reciprocals of certain measured times. These terms are so small that the possibility of error increases substantially. The second set of simplified equations has eliminated this type of term.

Figure 7:
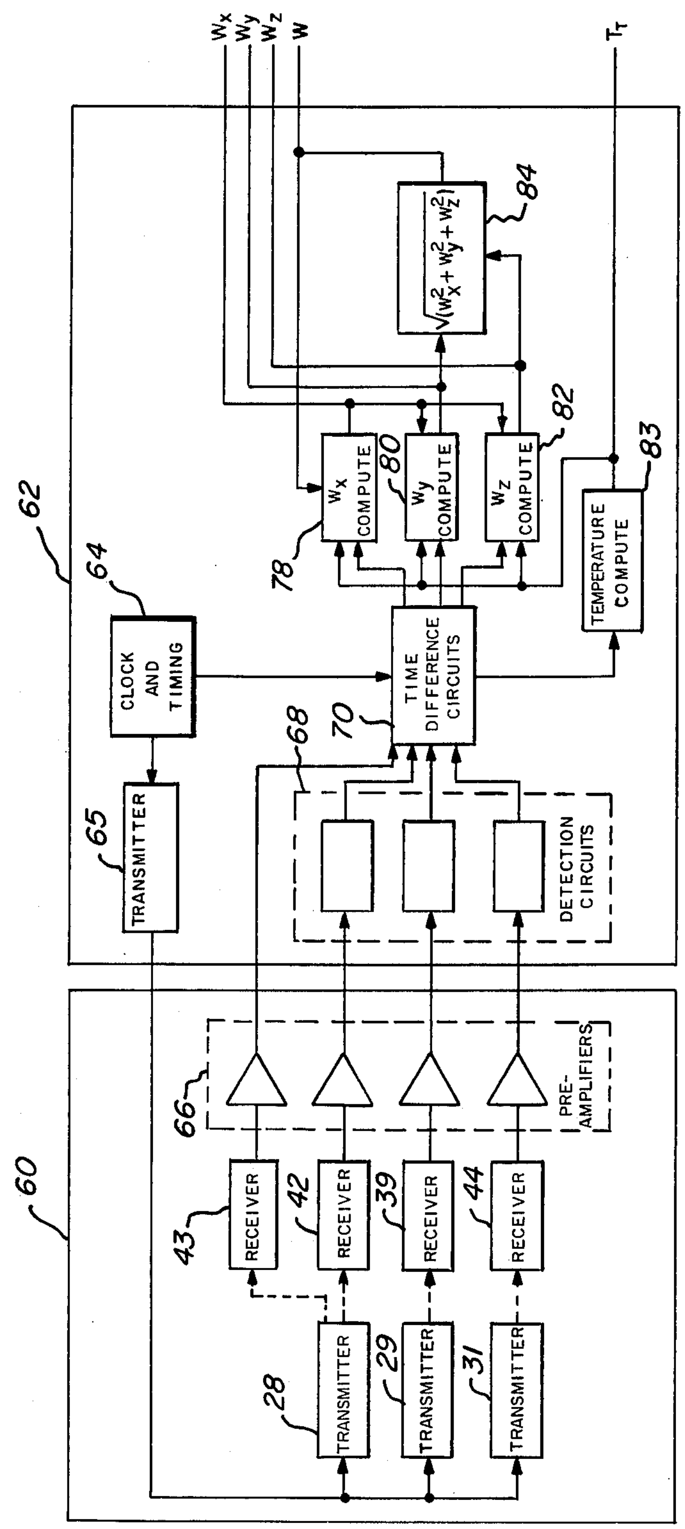
FIG. 7 illustrates diagrammatically control and sensing circuitry associated with the probe of FIG. 2.

The basic circuitry for implementing the electronics of the system is illustrated diagrammatically in FIG. 7 where the electronics for the sensor unit are represented within the general block 60 and the electronics of the detection and computation circuitry will be found within the block 62. The synchronizing of the overall system is derived from the clock signals originating from a timing clock 64. Signals from the clock 64 pass through a transmitter drive circuit 65 to feed a driving signal to the ultrasonic wave transmitters deemed here to include the transducers 28, 29 and 31. Signals from these transmitters are passed across the paths to the respective receivers 42 and 43, 39 and 44. The received signals pass through a preamplifier circuit 66 and then to detection circuitry 68, the latter of which shapes the pulses received from the preamplifiers into a form such that the differential in time of propagation of the signals in the four paths may be determined in the time difference circuits 70. These time difference circuits also receive a timing signal from the clock source 64.

Separate computational circuits are provided for each of the major wind vectors and the temperatures which are to be measured. These circuits are basically similar and are internally organized in order to implement the calculations of the simplified equations set forth above. Computation circuit 78 is used to compute the $W_x$ air movement vector, and the computation circuit 82 is provided to compute the $W_z$ air movement vector. The temperature is calculated in the computation circuit 83. The amplitude of the full relative wind from which the vectors are derived is computed in the computation circuit 84. The outputs of these five computational circuits are then available for use with appropriate indication and/or control circuitry associated with the aircraft carrying the equipment.

The detail of the computational circuitry may be implemented using circuitry of the type illustrated and described in the aforementioned copending application of D. J. Rotier, bearing Ser. No. 675,036. The circuitry may also be implemented utilizing circuitry of the type discussed below in FIG. 9 making appropriate adjustment for the fact that a single temperature sensing path between the transmitter transducer 28 and receiver transducer 43 is utilized in the embodiment discussed thus far.

In order to provide a more accurate temperature measurement, it has been determined that the use of three separate temperature sensing paths are desirable and for this purpose, additional receiving transducers may be similarly positioned to that of the transducer 43 in each of the receiver housings 36 and 40 as those housings are illustrated in FIG. 3. The relative positioning of these additional receiver elements is schematically represented in FIG. 8 wherein additional receiver transducer elements 46 and 47 are shown to be positioned in a common plane with the receiver transducer 43, this plane being perpendicular to the primary or X axis of the probe assembly and intersecting that axis at a point 49 and passing through the common plane of the transmitting transducers 28, 29 and 31.

Operationally, the function of the schematic arrangement shown in FIG. 8 will be similar to that in FIG. 4 except that the transit times of the two additional ultrasonic wave signals will be available for temperature measuring purposes, these two additional paths being determined by the path between the transmitting transducer 39 and receiver transducer 46 and the transmitting transducer 31 and the receiver transducer 47.

The exact equations for determining the wind vector and temperature components for apparatus implemented as illustrated in FIG. 8 may be calculated using the following equations:

$$W_x = \frac{-R}{3}\left(\frac{1}{t_1}+\frac{1}{t_2}+\frac{1}{t_3}\right) - \frac{C^2 - W^2}{6R}(t_1 + t_2 + t_3)$$

$$W_y = -R\frac{\sqrt{3}}{3}\left(\frac{1}{t_2}-\frac{1}{t_3}\right) + \sqrt{3}\,\frac{C^2 - W^2}{6R}(t_2 - t_3)$$

$$W_z = \frac{R}{3}\left(\frac{2}{t_1}-\frac{1}{t_2}-\frac{1}{t_3}\right) - \frac{C^2 - W^2}{6R}(2t_1 - t_2 - t_3)$$

$$W^2 = W_x^2 + W_y^2 + W_z^2$$

$$C^2 - W^2 = R^2\left(\frac{1}{t_4}+\frac{1}{t_5}+\frac{1}{t_6}\right)\left(\frac{1}{t_4 + t_5 + t_6}\right)$$

For ease of implementation, and, without any loss of effective accuracy, the following equations are preferred:

$$W_x = S_1W^2 + [S_2 + S_3W^2 + S_4(T-25)]\,[t_1+t_2+t_3-3t_o] + [S_5(T-25) + S_6(T-25)^2]$$

$$W_y = Q_1\,[Q_2 + Q_3W_x + Q_4(T-25)]\,[t_2 - t_3]$$

$$W_z = Q_5\,[Q_2 + Q_3W_x + Q_4(T-25)]\,[2t_1 - t_2 - t_3]$$

$$W^2 = W^2_x \quad W^2_y + W^2_z$$

$$- \left[\begin{array}{l} C = C_o - C_o\dfrac{C}{3R}[t_4 + t_5 + t_6 - 3t_{o4}] + W^2\left[\dfrac{3}{2C_o} - \dfrac{C}{C_o^2}\right] \\ (T-25) = 298\left(\dfrac{C^2 - C_o^2}{C_o^2}\right) + P_1W_x^2 + P_2W_y^2 + P_3W_z^2 \end{array}\right.$$

$$\frac{C - C_o}{C_o} = -\frac{C}{3R}[t_4 + t_5 + t_6 - 3t_{o4}] + W^2\left[\frac{3}{2C_o^2} - \frac{C}{C_o^3}\right]$$

$$(T-25) = 298\left(\frac{C - C_o}{C_o}\right)^2 + 298 \times 2 \times \left(\frac{C - C_o}{C_o}\right) + P_1W_x^2 + P_2W_y^2 \times P_3W_z^2$$

In the foregoing equations, $Q_1$, $Q_2$, $Q_3$, $Q_4$, $Q_5$, $S_1$, $S_2$, $S_3$, $S_4$, $S_5$, $S_6$, and $P_1$, $P_2$, $P_3$, are all constants. $R = 0.55575$, $C_o = 346.192$, $t_o = 227.0278 \times 10^{-6}$, $t_{04} = 160.5329 \times 10^{-6}$, $T$: °centigrade, $W$, $W_x$, $W_y$, $W_z$: Meters/Sec.

The mathematical manipulations required for the overall system may be implemented with an electronic circuit of the type diagrammatically illustrated in FIG. 9. This particular embodiment utilizes a microprocessor at the heart thereof. The particular microprocessor selected is, of course, a choice of designer but in one preferred embodiment, an INTEL MC 8080A microprocessor was selected. The microprocessor is programmed to provide the basic control and sequencing for the system and to carry out the mathematical calculations associated with the foregoing equations so as to provide at the output thereof digital or analog representations of airspeed and temperature as desired.

Considering FIG. 9 in greater detail the apparatus is seen to comprise a transmitter drive circuit 90 which supplies signals for activating the transmitter transducers 20, 29 and 31 to project ultrasonic wave signals to the receivers associated therewith. The transmitting transducer 28 projects an ultasonic wave toward the receiver transducers 42 and 43. The transmitting transducer 29 transmits an ultrasonic wave toward the receiver transducers 39 and 46. The transmitter transducer 31 transmits an ultrasonic wave toward the receiver transducers 44 and 47. The relative positions of those receivers are as schematically illustrated in FIG. 8 as discussed above.

The outputs of the receiver transducers are fed into a preamplifier circuit 92 whose outputs are then fed into a receiver multiplex circuit 94. The multiplex circuit 94 is controlled by a multiplex logic circuit 96 so as to selectively and sequentially feed the signals from the preamplifier circuits 92 into the time difference determining circuitry. The input to this circuit from the multiplexer 94 passes through a further amplifier circuit 98 into a digitizer circuit which includes a bandpass amplifier 100 which passes the input signal to a peak detector 102 and a zero crossover detector 104. The outputs of these two detector circuits 102 and 104 serve to create a counter stop signal by way of a start-stop logic circuit 106, the latter of which controls the functioning of a binary counter 108 by way of a further counter multiplex and logic circuit 110.

The binary counter 108, in a preferred embodiment comprised a 12-bit synchronized, programmable, binary counter, which was clocked at a 5 MHz rate. The counter is adapted to be preset at the start of each transit time measuring cycle, this presetting being derived from the microprocessor circuitry including the address decode circuit 112. A transmit signal is derived from the microprocessor clock 114 which, in turn, feeds a countdown and logic circuit 116. This circuit also supplies the control signals for activating the transmitter drive circuits 90 and the receiver multiplex logic circuit 96 by way of further logic circuit 118. In addition, the countdown circuit 116 provides the signal for activating the counter 108 and this counter will, when activated, commence a counting function which will be stopped at a time which is directly related to the transit time associated with an ultrasonic signal passed from a selected transmitter transducer to a selected receiver transducer.

Once the counter has been stopped, the signal from the counter will be fed from the counter into the buffer and controller circuits 120 which interfaces with a microprocessor 122. The digitized input signal may then be appropriately stored in memory associated with the microprocessor such as in a random access memory 124, at an address selected by the microprocessor and coupled to memory 124 by way of the address buffer circuit 123. Additional memory is associated with the microprocessor 122 in the form of a programmable read only memory 126, which will store the system program, and a read only memory 128, the latter being useful for storing the constants associated with the mathematical calculations to be made. The programmable read only memory 126 may be used to store the program required for the system sequencing and the making of the calculations on the digital input data stored in the random access memory 124 along with the constants stored in the read only memory 128. Counter 108 also provides an output signal to act on an interrupt circuit 130 which is adapted to make certain that the microprocessor is ready to accept the incoming data from the counter 108 when the digitizing of the input signal has been accomplished by the stopping of the counter 108.

Also included in the input circuit of the digitizer is a valid pulse logic circuit 132 which circuit insures that a digitized signal is selected only upon there being a valid input. This minimizes the effects of noise which might otherwise create false signals on the input to the counter.

The output digitized signals representing the calculated wind vectors and temperature will be selectively fed into a digital to analog converter circuit including an input logic circuit 134 and the D/A converter 136. The analog output of the converter 136 will then be selectively switched by way of a multiplex circuit 138 to a series of sample and hold circuits 140, 142, 144, 146 and 148, these circuits respectively having on their outputs the temperature signal T and the wind or airspeed signals $W$, $W_x$, $W_y$, and $W_z$.

In considering the operation of the circuitry of FIG. 9 in greater detail, it should first be noted that the heart of the control is the microprocessor 122 functioning under program control to do the sequencing and the calculations required of the system. In any particular operational cycle, the processor 122 will provide a series of signals for selectively activating the ultrasonic transmitter transducers and selectively creating from the transit times in the six ultrasonic signal paths digitized signals for use in the calculations to be performed in the processor. Thus, all of the variables associated with the transmitter - receiver transducers must first be determined, and then stored in the random access memory 124, at address locations selected by signals from the microprocessor by way of an address buffer 123. The computer system will then be ready to perform the calculations in accordance with the formulas set forth above using the program stored in the read only memory 126 and the constants from the read only memory 128. Once the calculations are completed, the results, as stored in the random access memory 124, may then be transferred on a sequential basis to the output D/A converter 136 and selectively transmitted to the appropriate sample and hold circuit on the output by way of the output logic circuit 138 as directed by address control signals from the address decode circuit 112.

It will be readily apparent that the processing of the input signals may be performed using analog techniques throughout, consequently the selection of the particular signal processing circuit will be dependent upon factors relating primarily to cost and ease of implementation as well as the need for havng computational capability for purposes other than those illustrated in the present application.

There have been illustrated and described preferred embodiments of the invention. It will be obvious to those skilled in the art that modifications may be made within the spirit of the invention and, therefore, the scope of the invention should be considered in the light of the claims in which the invention is claimed as follows.

We claim:

1. A relative air movement vector, magnitude and temperature sensing apparatus for use with an aircraft comprising:

a sensing probe adapted to be mounted in an airstream associated with the direction of primary movement of the aircraft, said probe including a first centrally positioned housing supporting an ultrasonic wave transmitting transducer means and a plurality of separate housings spatially positioned about said first housing and each including an ultrasonic receiver transducer and one of which includes at least two of said receiver transducers, each of said housings being configured to permit essentially undisturbed airflow in any signal transfer path between the transmitting and receiver transducers;

an ultrasonic wave source connected to said transmitting transducer means to activate said transmitting transducer means to project ultrasonic wave energy therefrom and toward said receiver transducer means;

signal amplifer means connected to said receiver transducer means to receiver wave energy received by said receiver transducer means;

and means connected to the output of said signal amplifier means to measure the time difference in the received signals received by said plurality of receiver transducer means from said transmitting transducer means and thereby the relative vector, velocity and temperature of air moving relative to said probe.

2. Apparatus as defined in claim 1, wherein said transmitting transducer means of said probe is positioned on a centrally positioned support, and which is adapted to project ultrasonic wave energy along at least four paths, three of which are at a uniform angle displaced from a common axis and the fourth of which is at an angle greater than said uniform angle, and wherein said receiver transducer means are four in number, each of which is uniquely positioned about said common axis to receive ultrasonic wave energy projected along one each of the paths from said transmitting transducer means.

3. Apparatus as defined in claim 2, wherein the angle of each of said three paths, with respect to the common axis, is approximately 45°, and the angle of said fourth path is approximately 90° with respect to said common axis, and each of said receiver transducer means are positioned at a distance from said common axis greater than that of said transmitting transducers.

4. Apparatus as defined in claim 3, wherein three of said receiver transducers are in a common plane which is perpendicular with respect to said common axis and said three receiver transducers are displaced from each other in said common plane by approximately 120°.

5. Apparatus as defined in claim 4, wherein each of said receiver transducers are housed within the side of a separate elongated housing and each is facing toward said transmitting transducer means.

6. A gaseous movement and temperature sensing apparatus comprising:

an ultrasonic wave transmitting transducer means comprising a common support element having a conical outer surface with three transmitting transducer elements mounted in the conical surface and displaced relative to each other by approximately 120°, three separte ultrasonic receiver transducer means spatially positioned about said transmitting transducer means and each aligned with one each of said transmitting transducer elements along a line extending perpendicular from said conical surface; and a fourth receiver transducer spatially positioned from one of the transmitting transducers at a position displaced from a lone perpendicular from said conical surface;

an ultrasonic wave energy source connected to said transmitting transducer means to activate said transmitting transducer means to project ultrasonic wave energy from each of said transducer elements toward said receiver transducer means;

and means connected to said receiver transducer to measure the time difference in the received signals received by said four receiving transducer means and thereby the relative movement and temperature of a gaseous medium passing said sensing apparatus.

7. Apparatus as defined in claim 6, wherein said further receiver transducer means comprises three separate receiver transducers positioned in a common plane about said transmitting transducer means.

8. Apparatus as defined in claim 7, wherein said common plane is perpendicular to the central axis of said apparatus and extends through the transmitting transducer elements mounted on said common support element.

9. Apparatus as defined in claim 8, wherein said first named three separate receiver transducer means and said second named receiver transducer means and said second named receiver transducer means are mounted in a common structure having three support arms positioned about said common suport element with two receiver transducer means, one each from the first and second named receiver transducer means, carried by each support arm.

10. Apparatus as defined in claim 9 wherein said first named three receiver transducer means are positioned in a common plane perpendicular to and intersecting said common axis at a point forward of said transmitting transducer means.

* * * * *